United States Patent [19]

Matsumoto

[11] 4,095,158
[45] June 13, 1978

[54] POSITION-CONTROLLING SYSTEM

[75] Inventor: Mitsuo Matsumoto, Kokubunji, Japan

[73] Assignee: Tokyo Shibaura Electric Co., Ltd., Kawasaki, Japan

[21] Appl. No.: 724,863

[22] Filed: Sept. 20, 1976

[30] Foreign Application Priority Data

Sept. 19, 1975 Japan .............................. 50-112722

[51] Int. Cl.² .......................................... G05B 19/28
[52] U.S. Cl. ................................... 318/603; 318/608; 364/770
[58] Field of Search ...................... 318/603, 608, 661; 235/151.11

[56] References Cited

U.S. PATENT DOCUMENTS

| 3,854,081 | 12/1974 | Benaglio | 318/603 X |
| 3,872,369 | 3/1975 | Rich | 318/603 |
| 4,023,085 | 5/1977 | Bishop et al. | 318/603 |

Primary Examiner—B. Dobeck

Attorney, Agent, or Firm—Oblon, Fisher, Spivak, McClelland & Maier

[57] ABSTRACT

A position-controlling system which comprises a reference counter periodically giving a referential pattern numeral; a resolver forming an excited waveform from the referential pattern numeral given by the reference counter and detecting the position (angle of rotation) of a movable machine section in the term of a phase data per prescribed period of time; a buffer register loaded with the content of the reference counter corresponding to the phase data; and a controller supplied with a data on the detected position of the movable machine section stored in the buffer register and a data of the position instruction thereby to produce an output denoting an accumulative position errors occurring per prescribed period of time in the actual moving of the movable machine section, and wherein a servo system is operated upon receipt of a periodic output from the controller according to instructions on the momentarily changing positions of the movable machine section, thereby controlling the machine positions.

5 Claims, 9 Drawing Figures

POSITION-CONTROLLING SYSTEM

BACKGROUND OF THE INVENTION

This invention relates to a position-controlling system and more particularly to a position-controlling system for a machine tool whose position should be defined with high precision.

A position-controlling system, for example, a numerical control system for a machine tool is supplied with a data on the specified position which should be finally reached by the movable section of the machine tool, and based on said data, periodically calculates a numeral denoting each instructed incremental moving of the movable machine section which is required for said section to reach the specified position. Data on the detected actual position of the movable machine section delivered from a position detector attached to a machine tool is periodically converted to a numeral denoting each actual incremental moving of the movable machine section at said detected position. Therefore, the position detector is required periodically to produce an output indicating a correct data on the current position of the movable machine section. However, the customary phase type position detector presents difficulties in correctly detecting the current position of the movable machine section per prescribed period of time. In contrast, an encoder type position detector also accepted in the past can indeed easily provide a data on the current position of the movable machine section per prescribed period of time, but is far more expensive than the phase type position detector and undesirably has low reliability.

SUMMARY OF THE INVENTION

It is accordingly the object of this invention to provide an inexpensive position-controlling system capable of correctly detecting the current position of a movable section of, for example, a machine tool per prescribed period of time and reliably controlling said position.

According to an aspect of this invention, there is provided a position-controlling system, which is supplied with instructions on the momentarily changing positions of a movable machine section and calculates a numeral denoting each instructed incremental moving of the movable section which is required for said section to reach the specified position, thereby controlling the position of the movable section through a servo system. This object is attained by providing a position-controlling system which comprises a reference counter periodically calculating a referential pattern numeral; a phase type position detector excited according to a count made by the reference counter; and a buffer register loaded with a count made by the reference counter according to an output from the position detector showing the current phase of the movable machine section, and whrein a data stored in the buffer register is taken to denote the detected position of the movable machine section. Therefore, the position-controlling system of this invention is useful for a movable section of, for example, a machine tool, whose position should be determined with very high precision and to which a position instruction should be given to cause the movable section to be fed at prescribed speed.

A position-controlling system according to another embodiment of this invention is provided with a circuit for correcting a position data detected by the phase type position detector, making it possible reliably to control the position of the movable machine section through correction of detected errors.

A position-controlling system according to still another embodiment of the invention calculates, upon receipt of a position instruction, a numeral denoting each instructed incremental moving of a movable machine section which is required for said section to reach the specified position, is supplied with a data on the detected position of the movable machine section delivered from the position detector, and furtehr comprises a circuit for periodically computing a total of errors occurring between a data on the detected actual position of the movable machine section and a numeral denoting each instructed incremental moving of said section. This circuit may be formed of a fixed wiring type circuit or computer. Therefore, the position-controlling system according to said still another embodiment can be easily constructed.

DETAILED DESCRIPTION OF THE PREFERRED EMBODIMENTS

Figure 1:
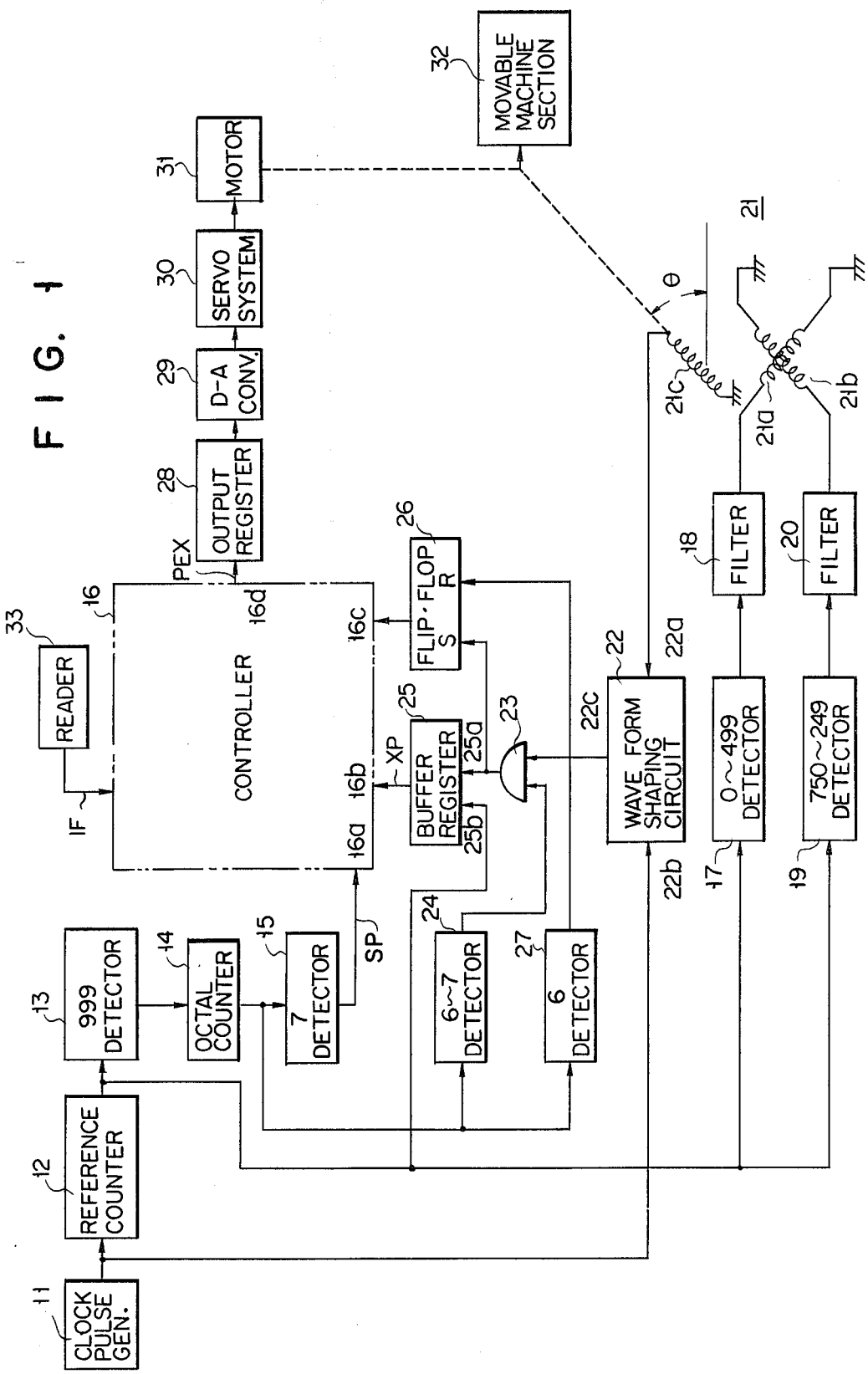
FIG. 1 is a block circuit diagram of a position control system according to an embodiment of this invention.

Referring to FIG. 1 showing a block circuit diagram of a position control system embodying this invention, referential numeral 11 is a clock pulse oscillator generating a clock pulse haivng a fixed frequency of 5 MHz. A clock pulse from the clock pulse oscillator 11 is supplied to a reference counter 12, which is an addition counter of 1000 scale. A data stored in the reference counter 12 is increased by one, each time a clock pulse is received. When a clock pulse is supplied to the reference counter 12 when its data indicates 999, then the data is brought to "0" by upcounting. An output from the reference counter 12 is conducted to a 999- count detector 13. When the data of the reference counter 12 is changed from "999" to "0", the 999-count detector 13 produces an output clock pulse showing said change at a divided frequency of 5 MHz/1000 = 5 kHz. The 5 kHz clock pulse is sent forth to an Octal (8-scale) counter 14, whose content is increased by "+1" each time said 5 kHz clock pulse is received, and is returned to "0" by upcounting when "7" is counted. An output from the Octal counter 14 is delivered to a "7" detector 15. When the content of said Octal counter 14 is changed from "7" to "0," then said counter 14 issues an output denoting said change at a divided frequency of 5 kHz/8 = 625 Hz. An output clock pulse from the "7" detector is supplied to a computer or a fixed wiring type controller 16 as a sampling pulse SP and thereby the controller 16 periodically calculates a numeral denoting each instructed incremental moving of a movable machine section 32 which is required for said section to reach the specified position. Accordingly, the sampling pulse SP is issued at an interval of $1/625 \approx 1.6$ miliseconds.

An output 5 kHz clock pulse from the reference counter 12 is transmitted to a "0–499" detector 17. This detector 17 generates an output having a logic level of "1", only when the content of the reference counter 12 indicates "0" to "499", and an output having a logic level of "0" when the reference counter 12 makes any other count. While passing through a filter 18, an output from the "0–499" detector 17 has its high frequency component removed to be converted into a sine wave of 5 kHz. This 5 kHz output from the filter 18 is supplied to one stator winding 21a of a resolver 21 for excitation.

An output from the reference counter 12 is carried to a "750–249" detector 19. This detector 19 produces an output having a logic level of "1" only when the content of the reference counter 12 indicates "750" to "249." While conducted through the filter 18, an output from the "750–249" detector 19 has its high frequency component removed to be converted into a 5 kHz sine wave. This 5 kHz sine wave delivered from the filter 18 is sent forth to another stator winding 21b of the resolver 21. This resolver 21 is an electrical device used to detect changes in the rotation angle of a rotor winding 21c, transmit said rotation angle, and is provided, as is well known, with two-phase winding, with the rotor and stator spatially arranged with a phase difference of 90°. Both stator windings 21a, 21b of the resolver 21 are impressed with sine wave excitation voltages having a phase difference of 90°, causing a rotating magnetic field to be created in said both stator windings 21a, 21b. Induced in a rotor winding 21c of the resolver 21 electromagnetically connected to the rotation magnetic field is the same 5 kHz voltage as that for exciting the stator windings 21a, 21b. The rotor (not shown) of the resolver 21 is directly connected to the later described servo motor. Where the movable machine section 32 is made to run by the rotation of the servo motor, then a rotor (not shown) is turned. With $\theta$ taken to represent the rotation angle of the rotor winding 21c, the phase of voltage induced in the rotor winding 21c which corresponds to the excitation voltage impressed on the stator windings 21a, 21b is proportonal to the rotation angle $\theta$ of the rotor winding 21c.

Figure 2A:
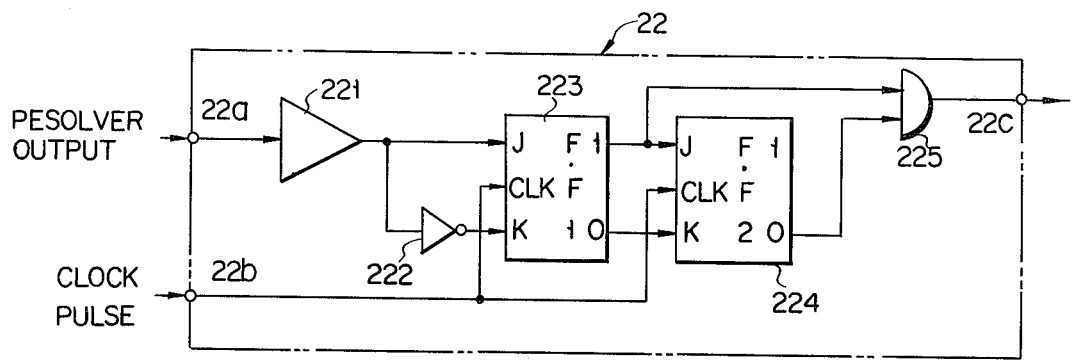
FIG. 2A is a detailed circuit diagram of a waveform shaper included in FIG. 1.
Figure 2B:
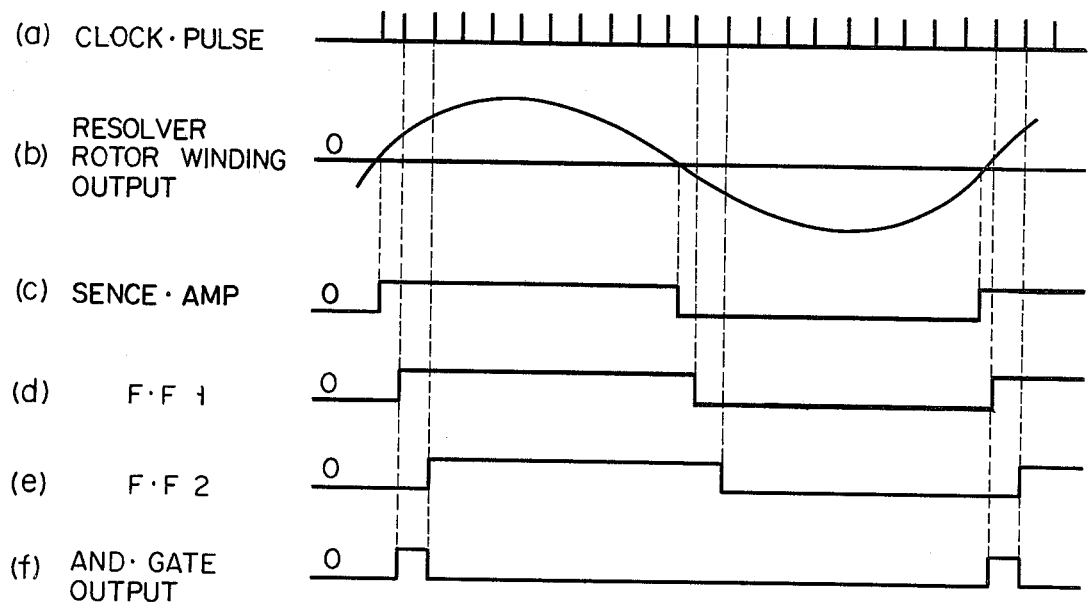
FIG. 2B is a time chart of the waveform shaper of FIG. 2.

Voltage induced in the rotor winding 21c of the resolver 21 is conducted to one input terminal 22a of a waveform shaping circuit 22, th other input terminal 22b of which is supplied with a 5 MHz clock pulse issued from the clock pulse oscillator 11. When input voltage impressed on said one terminal 22a of the waveform shaping circuit 22 is changed from negative to positive, then said waveform shaping circuit 22 issues one pulse having one clock pulse time width in synchronization with a clock pulse conducted to the other input terminal 22b. FIG. 2A shows a detailed circuit of the waveform shaping circuit 22. This waveform shaping circuit 22 comprises a sense amplifier 221 for amplifying an output from the rotor winding 21c of the resolver 21; an inverter 222 for inverting an output from the sense amplifier 221; two J-K flip-flop circuits 223, 224 designed to be set or reset by a clock pulse according to changes in an output from the sense amplifier 221; and an AND gate 225 for gating both outputs from the two J-K flip-flop circuits 223, 224. The waveform shaping circuit 22 is operated according to a time chart shown in FIG. 2B. Where an output shown in FIG. 2B(b) from the rotor winding 21c of the resolver 21 is supplied to the sense amplifier 221 (FIG. 2A) through a terminal 22a, then the sense amplifier 221 generates an output shown in FIG. 2B(c). Where the sense amplifier 221 sends forth an output having a logic level of "1," then the flip-flop circuit 223 is set by the succeeding clock pulse, and the flip-flop circuit 224 is set by the succeeding clock pulse delayed by one clock pulse time width. The operation of said flip-flop circuits 223, 224 is illustrated in FIGS. 2B(d) and 2B(e) respectively. An output clock pulse issued from the AND gate 225 has a one clock pulse time width as shown in FIG. 2B(f).

An output clock pulse from the waveform shaping circuit 22 is conducted to one input terminal of the AND gate 23 (FIG. 1) An output from the "6–7" detector 24 is transmitted to the other input gate of the AND gate 23. An output from the Octal counter 14 is supplied to the "6–7" detector 24. This "6–7" detector 24 produces an output having a logic level of "1" only when the content of the Octal counter 14 indicates "6" and "7." An output from the AND gate 23 is delivered to one input terminal 25a of the buffer register 25. An output from the reference counter 12 is carried to the other input terminal 25b. When said one input terminal 25a of the buffer register 25 receives a clock pulse, the buffer register 25 is stored with the content of the reference counter 12. This stored data is held in the buffer register 25 until said one input terminal 25a is supplied with the succeeding clock pulse. An output from the buffer register 25 is sent forth to the controller 16. An output from the AND gate 23 is carried to the set terminal S of a flip-flop circuit 26. The reset terminal R of the flip-flop circuit 26 is supplied with an output from a "6" detector 27. This "6" detector 27 issues an output having a logic level of "1" only when the Octal counter 14 has a content of "6." The flip-flop circuit 26 is set when the set terminal S is supplied with a clock pulse having a logic level of "1." Where the reset terminal R receives a clock pulse having a logic level of "1," the flip-flop circuit 26 is reset, regardless of the logic level of a signal supplied to the set terminal S. Though an output from the flip-flop circuit 26 is supplied, as shown in FIG. 1, to the controller, yet said output is not connected to any internal circuit of the controller 16. The flip-flop circuit 26 is detailed in the later described example.

When supplied with a sampling pulse SP from the 7 detector, data XP on the detected position of the movable machine section 32 delivered from the buffer register 25 and data IF on the speciified position of the movable machine section 32 supplied from a reader 33 through an instruction tape, then the controller 16 determines a numeral $\Delta X$ denoting each instructed incremental moving of a movable machine section 32 which is required for said section 32 to reach the specified position at an interval $\Delta T$ of $1/625 = 1.6$ miliseconds. The controller 16 will be further detailed. An output from the controller 16 is transmitted to an output register 28 to be stored therein. An output from the output register 28 is converted into an analog amount from a digital amount by a digital-analog converter 29. Data on position errors regarding the detected position of the movable machine section 32 thus converted into an analog amount is conducted to a servo system 30 (for example, an amplifier or compensation circuit) to be amplified. An output from the servo system 30 is delivered to a servo motor 31 for its drive. Rotation of the servo motor 31 causes the movable section of, for example, a machine tool to travel along its axis and also the rotaton angle θ of the rotor winding 21c of the resolver 21 to be changed.

Figure 3:
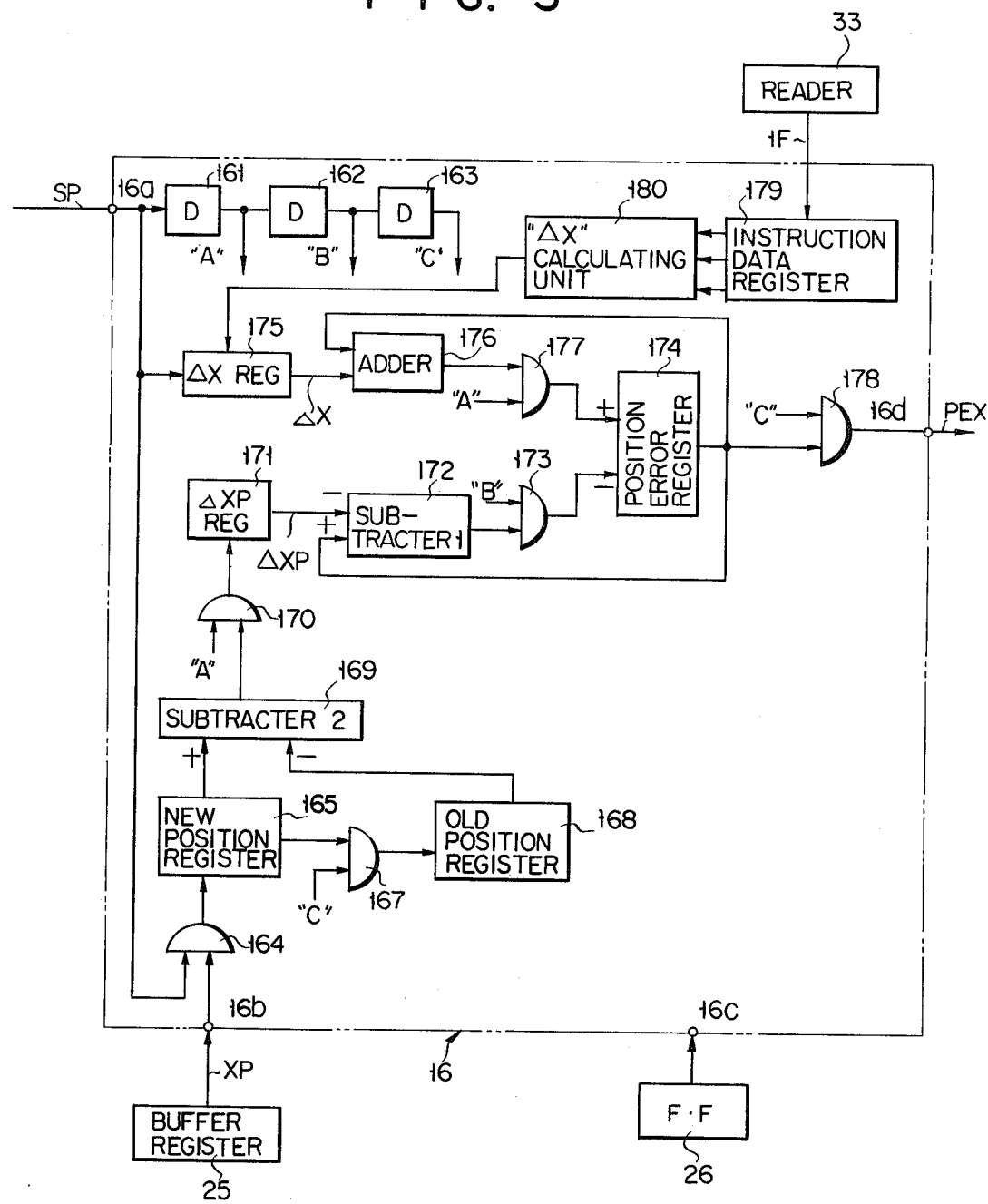
FIG. 3 is a detailed circuit diagram of a controller included in FIG. 1.

FIG. 3 shows a detailed circuit of the controller 16. A smapling pulse SP is delayed for a prescribed length of time in delay circuits 161, 162, 163, producing outputs "A," "B," "C" therefrom successively delayed in the order mentioned. These delayed outputs "A," "B," "C" are used into controller 16 to control the timing of the subject position-controlling system. A data XP on the detected position of the movable machine section 32 already stored in the buffer register 25 is shifted to a new position data register 165 through an AND gate 164, each time the sampling pulse is received. A new positon data is stored in an old position data register 168 through an AND gate 167. A data on the old position of the movable machine section 32 delivered from the register 168 is subtracted by a subtractor 169 from a data on the new position of said movable machine section 32 read out from the register 165. The result of subtraction is supplied, upon receipt of a timing signal A, to a register 171 for storing a numeral ΔXP denoting each detected actual incremental position moving of the movable machine section 32. This ΔXP resistor 171 is stored with a numeral ΔXP denoting a distance through which the movable machine section 32 has actually travled per prescribed period of time, each time the sampling pulse SP is received.

A position data stored in the rgister 171 is read out to another subtractor 172, where subtraction is made between said position data and a data on a position error regarding the detected position of the movable machine section 32 which is read out from a position error register 174. The result of subtraction is delivered to the position error register 174 through an AND gate 173, each time a timing control signal "B" is issued. A numeral ΔX representing each instructed position incremental moving of the movable machine section 32 which is required for said section to reach the specified position is calculated by a calculating unit 180 upon periodic receipt of the sampling pulse SP and then is read out to a ΔX register 175 to be stored therein.

An output from the ΔX register 175 and an output from the position error register 174 are supplied to an adder 176 to be added together. The result of addition is conducted to the + side terminal of the position error register 174 through an AND gate 177 upon receipt of the timing control signal "A."0 The position error register 174 is accumulatively stored at each time of sampling with a difference (or position error) between a numeral denoting each instructed incremental shifting of the movable machine section 32 which is required for said section 32 to reach the specified position and each detected actual incremental moving of said movable machine section 32. An output showing a PEX of position errors which is delivered from the position error register 174 is produced upon receipt of a timing signal "C" at the output terminal 16d of the controller 16 through an AND gate 178. An output from the controller 16 is stored in the output register 28. After converted into an analog data, said output drives the servo motor 31 to cause the movable machine section 32 to travel to a prescribed extent and also the rotor (not shown) of the resolver 21 to be rotated.

There will now be described by reference to FIG. 4a the concrete operation of the position-controlling system embodying this invention. Now let it be assumed that the reader 33 supplies the position-controlling system with a move instruction whose content momentarily changes at a fixed speed F (μm/ms) as illustrated by a straight line L1. Then a numeral ΔX denoting each instructed position incremental moving of the movable machine section 32 which is required for said section 32 to reach the specified position may be expressed by the following formula:

$$\Delta X = F \cdot \Delta T (\mu m) \quad (1)$$

A move instruction data IF issued from the reader 33 is stored in an instruction data register 179. The move instruction data IF stored in the instruction data register 179 is delivered to a calculating unit 180, where the numeral ΔX expressed by the above formula which denotes each instructed incremental moving of the movable section 32 which is required to reach the specified position is calculated upon receipt of the sampling pulse SP. The above-mentioned numeral ΔX is stored in the ΔX register 175 upon receipt of the sampling pulse SP and the numeral ΔX which is read out from said ΔX register 175 are accumulatively added to the position error register 174 through the adder 176 and AND gate 177 upon receipt of the timing control pulse "A".

Figure 4:
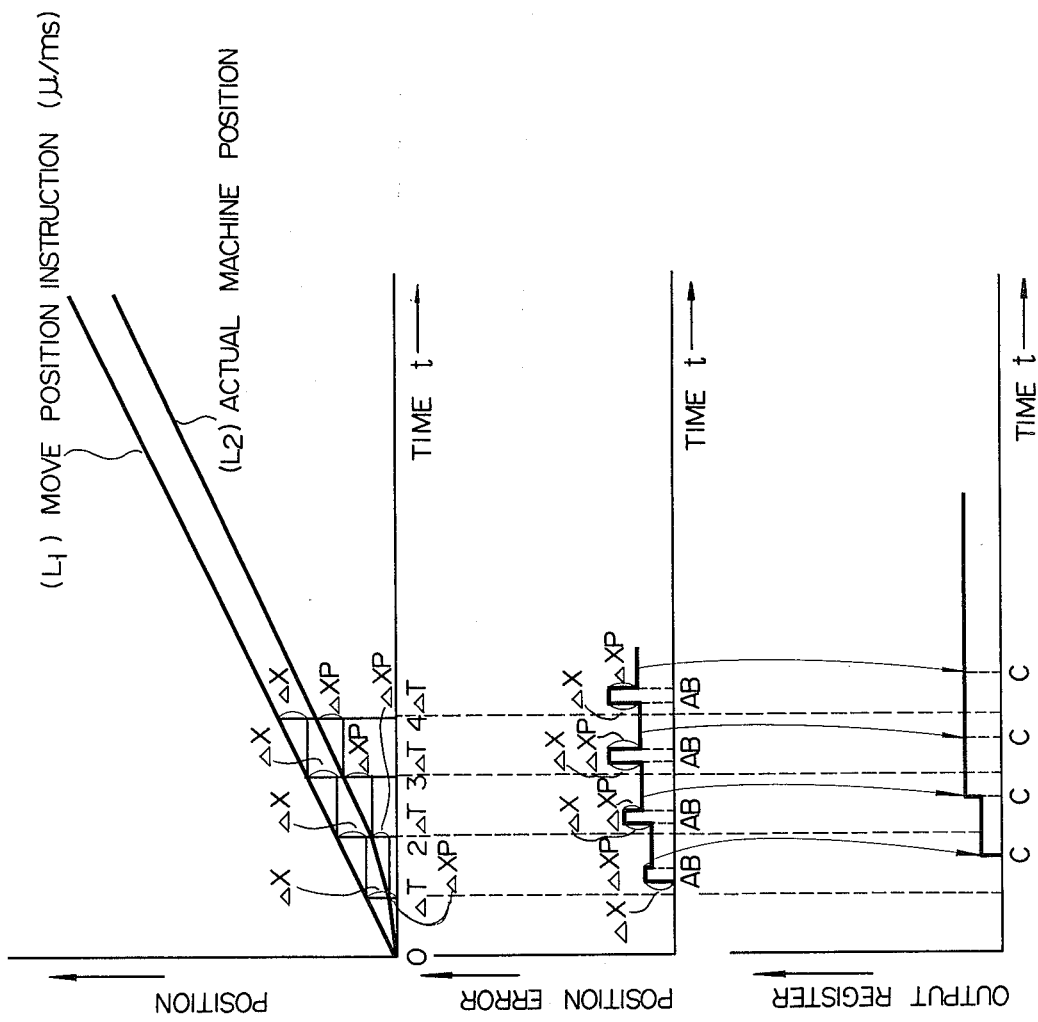
FIGS. 4A, 4B and 4C are time charts showing the operation of a position error register included in FIG. 3 and an output register included in FIG. 1.

Now let it be assumed that the instruction successive moving positions of the movable machine section 32 are expressed by the straight line L1 of FIG. 4A and the detected actual successive moving position of said movable machine section 32 are designated by a curve L2 of FIG. 4A. Then, an amount of each detected actual incremental moving of the movable machine section 32 is indicated by ΔXP. Data on the rotation angle θ of the rotor winding 21c of the later described resolver 21 is supplied to the controller 16 through the input terminal 16b to be determined thereby. Based on said determination, the above-mentioned amount ΔXP is calculated and stored in the ΔXP register 171. As previously described, the controller 16 supplies data on each instructed incremental moving of the movable machine section 32 to the position error register 174. Thereafter, the above-mentioned amount ΔXP denoting each detected actual incremental moving of the movable machine section 32 is subtracted by the subtractor 172 from the content of the position error register 174.

FIG. 4B shows the manner in which the controller 16 calculates a position error PEX from a formula (position error PEX + ΔX denoting each instructed position incremental moving of the movable machine section 32) at time "A" and also from a formula (position error PEX − each detected actual incremental moving of the movable machine section 32) at time "B." At time "C," the content of the position error register 174 is stored in the output register 28 through the output terminal 16d of the controller 16. Namely, the output register 28 has a content shown in FIG. 4C. The position error register 174 is accumulatively supplied at each sampling time with a numeral ΔX denoting each instructed position incremental moving of the movable machine section 32. A numeral ΔXP showing each detected actual position incremental moving of said movable machine section 32 is accumulatively subtracted from the progressively increased content of the position error register 174. Therefore the position error register 174 always has a content represented by a PEX of accumulative position errors. When changed from "0" to "positive," the content PEX of the position error register 174 is converted into an analog amount by the digital-analog converter 29 to drive the servo motor 31 in the forward direction through the servo system 30. Where, in this case, the movable machine section 32 is driven at an instructed speed F (μm/ms) by the servo motor 31, then the position-controlling system of this invention drives the movable machine section 32 in a state brought to equilibrium by a position error occurring at this time, namely, in a state accompanied with a fixed position error shown in FIG. 4C. Consequently, the curve L2 denoting each detected actual incremental moving of the movable machine section 32 becomes parallel with the straight line L1 showing the move instruction F(μm/ms).

Figure 5:
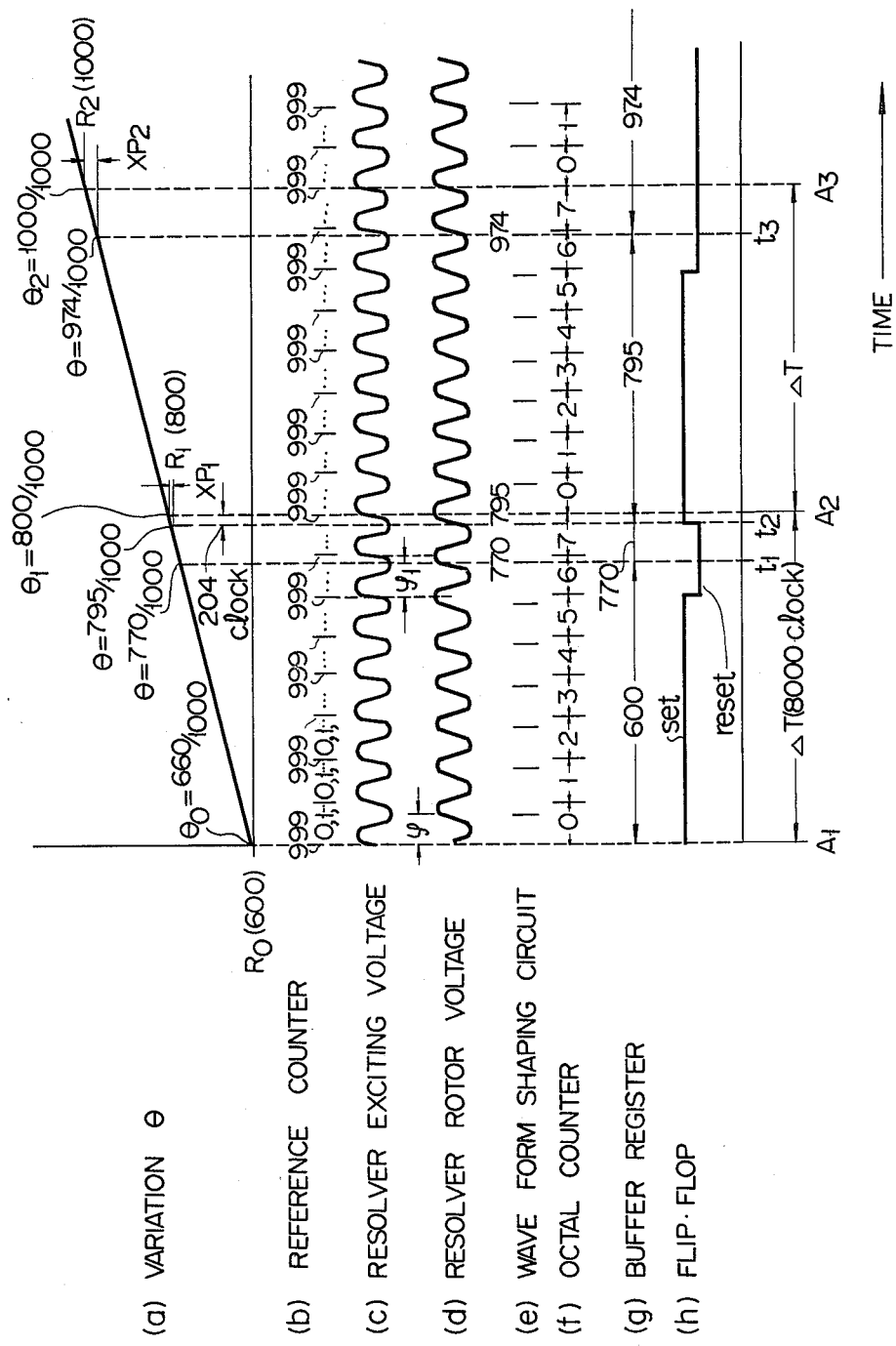
FIG. 5 is a time chart for explaining the system shown in FIG. 1.

There will now be described the process by which an amount ΔXP denoting each detected actual position incremental moving of the movable machine section is calculated from the rotating angle $\theta$ of the resolver 21 which constitutes the most vital member of the position-controlling system of this invention. FIG. 5 is a timing chart according to which the buffer register 25 and flip-flop circuit 26 are loaded with a data on the current position of the movable machine section 32. Points of time A1, A2, A3 respectively show the timing in which the sampling pulse SP is supplied to the input terminal 16a of the controller 16. FIG. 5(a) shows changes with time in the position of the shaft of the rotor (the rotating angle $\theta$ of the rotor winding 21c). The rotor of the resolver 21 rotates during each sampling period at a speed of 200/1000 rotation/ΔT. Namely, the rotation angle $\theta_0$ at time A1 of the resolver rotor indicates 600/1000 rotation, the rotation angle $\theta_1$ at time A2 stands at 800/1000 rotation and the rotation angle $\theta_2$ at time A3 shows 1000/1000 rotation. FIG. 5(b) presents the content of the reference counter 12 which is progressively increased from "0" to "999" with 5 kHz taken as a cyclic period. The stator winding 21a of the resolver 21 is excited by a sine wave of 5 kHz shown in FIG. 5(c) according to the content of the reference counter 12. The stator winding 21b is excited by a sine wave whose phase is advanced 90° from the stator winding 21a. When the stator windings 21a, 21b are excited, sine wave voltage shown in FIG. 5(d) is induced in the rotor winding 21c of the resolver 21. As is well known, the phase differential $\phi$ of said induced sine wave voltage from the excited voltage of the stator winding 21a coincides with the rotating angle $\theta$ of the rotor shaft of the resolver 21. The waveform shaping circuit 22 sends forth a signal having a waveform shown in FIG. 5(e).

The content of the Octal counter 14 is increased by one each time the content of the reference counter 12 is changed from "999" to "0" by upcounting with 5 kHz taken as a cyclic period. The content of the Octal counter 14 is repeatedly changed from "0" to "7" per 625 Hz. When the octal counter 14 has a content of "6" or "7," said content is detected by the "6-7" detector, which in turn produces an output having a logic level of "1." When the waveform shaping circuit 22 generates an output having a waveform shown in FIG. 5(e) at the output terminal 22c while the "6-7" detector 24 continues to send forth an output of logic level "1," then a signal having a logic level of "1" is issued through the AND gate 23 due to the AND condition being met. When supplied with an output from the AND gate 23, the buffer register 25 is also loaded with the content of the reference counter 12. At this time, the content of the buffer register 25 indicates any of "0" to "999" according to a value denoting the phase differential $\phi$. Referring to FIG. 5, the AND condition of the AND gate 23 is first met at time t1. Where the resolver 21 is rotated, as shown in FIG. 5(a), at a fixed rotation differential of 200/1000 per prescribed period ΔT, then the rotating angle $\theta$ of the resolver 21 indicates 770/1000 at time t1 when the AND condition is first met. At the result, the phase angle $\phi$ stands at 770/1000 × 360°. This means that the AND condition of the AND gate 23 is satisfied when the reference counter 12 has a content of "770," and the buffer register 25 is loaded with a data of "770" shown in FIG. 5(g).

When the AND condition of the AND gate 23 is again met at time t2, the rotating angle $\theta$ of the resolver 21 indicates 795/1000. Therefore, the buffer register 25 is supplied with a data of 795 from the reference counter 12. This data of "795" is held in the buffer register 25 as shown in FIG. 5(g), until the succeeding time t3 (when the AND condition of the AND gate 23 is again satisfied) is reached.

When the content "6" of the Octal counter 14 is detected by the "6" detector 27, then the flip-flop circuit 26 is reset. At time t2 when the Octal counter 14 has a content of "7" and the AND condition of the AND gate 23 is satisfied, then the flip-flop circuit 26 is set. This set state of the flip-flop circuit is sustained until the Octal counter 14 shows a content of "6."

At time A2 when the content "7" of the Octal counter 14 is changed to "0," a sampling pulse SP is transmitted from the output terminal of the "7" detector 15 to the input terminal 16a of the controller 16. Upon receipt of the sampling pulse SP, the controller 16 calculates a numeral ΔX denoting each instructed position incremental moving of the movable machine section 32, and also a position error PEX from a formula (position error PEX + a numeral ΔX denoting each instructed position incremental moving of the movable machine section 32), and is further supplied, upon receipt of a sampling pulse, with the content of the buffer register 25 through the input terminal 16b of the controller 16.

Upon receipt of a sampling pulse SP at time A2, the content "795" of the buffer register 25 is supplied to the new position data register 165. The content of the buffer register 25 at the preceding sampling time A1 is stored in the old position data register 168 of the controller 16 (the previous content of the buffer register 25 is "600" as shown in FIG. 5(g). In the controller 16, the content of the old position data register 168 is subtracted from the content of the new position data register 165 by the subtracter 169. The result of subtraction (795 − 600 = 195) is supplied, upon receipt of a timing signal A, to the register 171 for storing a numeral denoting each detected actual position incremental moving of the movable machine section 32. Upon receipt of a timing signal C, the content of the new position data register 165 is transferred to the old position data register 168 so as to be treated upon receipt of the succeeding sampling pulse SP.

A numeral ΔXP denoting each detected actual position incremental moving of the movable machine section 32 is subtracted, as previously mentioned, from the content of the position error register 174 by the subtracter 172. At a sampling time immediately following A3, the content of the buffer register 25 ("974" shown in FIG. 5(g)) is stored in the new position data register 165. The controller 16 again calculates a ΔXP data at said sampling time, with a difference (974 − 795 = 179) between the content of the new position data register 165 and the old position data register 168 taken to denote each detected actual incremental moving of the movable machine section 32.

With the foregoing embodiment, the buffer register 25 was designed to have a content changing from "0" to "999". Where, therefore, the resolver 21 happens to make more than one rotation per prescribed period of time ΔT (namely, at each sampling time), then it is impossible to detect each actual position incremental moving of the movable machine section 32. Where, however, the resolver 21 is designed always to make less than half rotation per prescribed period of time, then the position-detecting capacity of the position control system embodying this invention will be increased without limit. In this case, it is advised to provide a special type of subtracter for calculating a difference between the content of the new position data register 165 and that of the old position data register 168 with a mode of 1000 taken as the base of subtraction. For instance, where the new position data register 165 has a content of "10", and the old position data register 168 has content of "950", then subtraction is carried out as follows:

$$10 - 950 = -940 = -1000 + 60$$

In this case, a value "+60" arrived at by removing "−1000" from the last member of the above equation is taken as a numeral ΔXP denoting each detected actual position incremental moving of the movable machine section 32. Or where the new position data register 165 has a content of "950" and the old position data register 168 has a content of "10," then substraction is effected as follows:

$$950 - 10 = 940 = +1000 - 60$$

In this case, a value "−60" arrived at removing "+1000" from the last member of the above equation is taken as a numeral ΔXP denoting each detected actual position incremental moving of the movable machine section 32.

There will now be described a position-controlling system according to a second embodiment of this invention. With the preceding embodiment, a numeral ΔXP denoting each detected actual position incremental moving of the movable machine section 32 indicated 195 at sampling time A2 (the starting point of a prescribed period ΔT) and 179 at sampling point A3 (the terminal point of the prescribed period ΔT). Theoretically, however, a numeral ΔXP denoting each detected actual position incremental moving of the movable machine section 32 will be should indicate 200. Where a numeral ΔXP denoting each detected actual incremental moving of the movable section 32 is thus changed, then the content of the position error register 174 is also changed at each sampling time. As the result, the servo system fails smoothly to control the position of the movable machine section 32. Particularly where the movable machine section 32 is rapidly run, a numeral ΔXP denoting each detected actual position incremental moving of the movable machine section 32 is prominently changed in proportion to the operation speed of said section 32. In view of this fact, the second embodiment is designed to control the position of the rapidly running movable machine section 32 smoothly and correctly.

Figure 6:
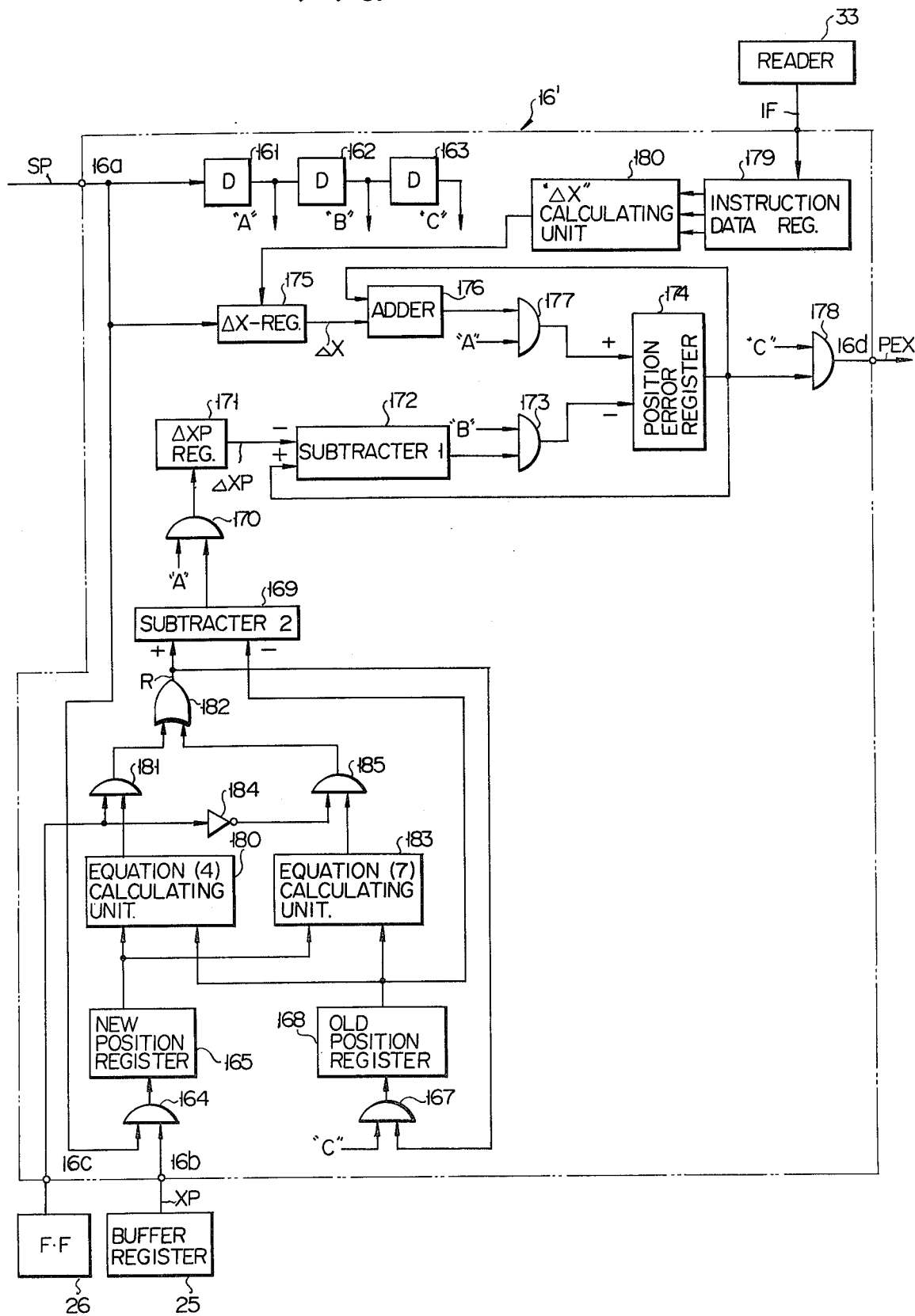
FIG. 6 is a detailed circuit diagram according to another embodiment of the invention.

With the second embodiment, the controller 16 of FIG. 1 has a circuit arrangement 16' of FIG. 6 which is characteristically provided with a circuit for correcting errors in a numeral ΔXP denoting each detected actual position incremental moving of the movable machine section 32. There wll now be described the process of correcting errors in the detected position of the movable machine section 32. When the content XP of the buffer register 25 is stored in the new position data register 165 at sampling time A2 of FIG. 5, then the content XP of said register 165 indicates "795." On the other hand, a value R1 arrived at by correcting the content XP of the new position data register 165 should properly stand at 800, as seen from FIG. 5(a). An error XP1 of 800 − 795 = 5 should be corrected by some means. This error XP1 results from the fact that the waveform shaping circuit 22 does not always produce an output shown in FIG. 5(e) exactly at the point of time at which the reference counter 12 has a content of "999." This type of error unavoidably arises, so long as a phase type position detector is applied. The reason is that such phase type detector always fails to provide a correct data on the position of the movable machine section 32 at sampling times A1, A2, A3 respectively, time t2 precedes the sampling time A2 by clock pulses having a number of 999 − 795 = 204, as can be referred from the fact that the new position data register 165 has a content of "795" and the flip-flop circuit 26 is set, 8000 clock pulses are issued per prescribed period ΔT as seen from FIG. 5. If R1 is taken to denote the detected position of the movable machine section at the sampling time A2, and the content R0 at the sampling time A1 is assumed to be "600," then the content R1 can be determined by the following equation (2) through application of a relationship similar to a triangular pattern illustrated in FIG. 5(a).

$$\frac{R1 - R0}{8000} = \frac{XP1}{999 - 795} = \frac{R1 - 795}{999 - 795} \quad (2)$$

Since R0 is 600 in FIG. 5(a), a correct value of R1=800 is obtained by substituting 600 in the above formula (2).

Where the content of the buffer register 25 supplied to the new position data register 165 of the controller 16 at the sampling time A2 is expressed by XP(0≦XP<999), then R1 can be calculated from the following equation in case the flip-flop circuit 26 is set:

$$\frac{R1 - R0}{8000} = \frac{R1 - XP}{999 - XP} \quad (3)$$

Therefore, $$R1 = \frac{8000XP - R0(999 - XP)}{7001 + XP} \quad (4)$$

Since XP and R0 of the above equation (4) have known values, R1 can be correctly determined. The controller 16' calculates the content R1 from the equation (4) by a calculating unit 180 and supplies, upon receipt of a timing signal A, a value arrived at by subcontracting the content R0 of the old position data register 168 from the R1 by the subtracter 169 and ΔXP register 171, and, upon receipt of the succeeding timing signal C, the value of the R1 to the old position data register 168. When, at the sampling time A3, the new position data register 165 of the controller 16' is supplied with the content of the buffer register 25, then the loaded content XP of the new position data register 168 indicates "974". With R2 taken to denote the actual position of movable machine section obtained by correcting its uncorrected content XP at the sampling time A3, then the fact that time $t_3$ at which the buffer register 25 supplies the content (XP=974) of the new position data register 165 precedes the sampling time A3 by clock pulses having a number of 1999 − 974 = 1025 can be inferred from the fact that the new position data register 165 has a content of "974" and the flip-flop circuit 26 is reset. The content R2 may be determined by the following equation:

$$\frac{R2 - R1}{8000} = \frac{R2 - 974}{1999 - 974} \qquad (5)$$

Substitution of R1=800 in the above equation can correctly determine R2 to be 1000. The controller 16 converts R2 into a numerical data by substraction with 1000 taken as a base, namely, into a number of "0" arrived at by removing 1000 from R2=1000+0.

With XP taken to denote the content of the buffer register 25 stored in the controller 16 when the flip-flop circuit 20 is reset, R2 may be calculated from the following equation:

$$\frac{R2 - R1}{8000} = \frac{R2 - XP}{1999 - XP} \qquad (6)$$

Therefore $$R2 = \frac{8000 - (1999 - XP)R1}{6001 + XP} \qquad (7)$$

The controller 16' of FIG. 6 is provided with a circuit for making the above-mentioned correction, thereby correctly to detect the position of the movable machine section. Where the controller 16' calculates a numeral ΔXP denoting each detected actual position incremental moving of the movable machine section at each sampling time, the content XP of the buffer 25 is first supplied upon receipt of a sampling pulse SP to the new position data register 165 through the input terminal 16b and AND gate 164 of the controller 16'. A signal showing the condition (set or reset) of the flip-flop circuit 26 is supplied to the controller 16' through the input terminal 16c. Where the flip-flop circuit 26 is in a set state "1", then a correct value of R1 obtained by correcting the content XP of the buffer register 25 is calculated by a calculating unit 180 associated with the formular (4) from the contents of the new and old position data registers 165, 168. The value of R1 thus calculated is conducted to the subtracter 169 through an AND gate 181 and OR gate 182. The subtracter 169 determines a difference between the output signal R of the OR gate 182 and the content of old data position register 168. The result of subtraction is supplied, upon receipt of a timing signal A, to the register 171 for storing a numeral ΔXP denoting each detected actual position incremental moving of the movable machine section 32 through an AND gate 170. The result of calculation made by the calculating unit 180 associated with the formula (4) is delivered, upon receipt of a timing signal C, to the old position data register 168 through the AND gate 167. Operation of the members of the controller 16' which follow the subtracter 169 is carried out in the same manner as described in FIG. 3.

Where the flip-flop circuit 26 is in a reset state "0," then the correct content of R2 is determined by a calculating unit 183 associated with the formula (7). The result of calculation is supplied to the subtracter 169 through an AND gate 185 opened by an inverter 184 and also through the OR gate 182. Later, the same operation as described above is carried out. The embodiment of FIG. 6 can smoothly and correctly control the position of a rapidly traveling movable machine section.

With the first and second embodiments, a computer may be used as the controllers 16, 16' for calculating the PEX of accumulative position errors occurring at each sampling time between a numeral ΔX representing each instructed position incremental moving of a movable machine section 32 and a numeral ΔXP denoting each detected actual position incremental moving of said movable machine section 32. In this case, the computer is stored with a properly prepared arithmetic operation program. A sampling pulse SP, move instructing data IF and a numeral XP denoting each detected actual position of the movable machine section 32 are handled as input in carrying out said arithmetic operation.

With the above-mentioned embodiments, a resolver was used as a position detector. However, another phase type position detector (for detecting a position data in the form of a phase), for example, an inductosym may be applied with the same effect as previously mentioned.

This invention is not restricted to the above-mentioned embodiments, but various changes and modifications can be made without departing from the spirit and scope of the invention.

What is claimed is:

1. A position-controlling system for calculating, upon receipt of a position-controlling instruction changing with time, each instructed position incremental moving value of a movable machine section per prescribed period of time, thereby to control the position of the movable machine section through a servo system, which comprises a reference counter for periodically providing a referential pattern numeral upon receipt of a clock pulse issued from a clock pulse oscillator; a phase type position detector for shaping an exciting waveform from a count made by the reference counter, thereby to detect the momentarily changing position of the movable machine section; means for producing a sampling control signal and a detection control signal from an output from the reference counter; a buffer register for storing the content of the reference counter according to a control signal supplied from the control signal-generating means and a phase data read out from the phase type position detector or preferably at a timing immediately preceding the sampling signal; and a controller for calculating each instructed position incremental moving value of the movable machine section per prescribed period of time upon receipt of a data on the detected position of the movable machine section read out from the buffer register, sampling signal and position control signal, thereby giving an accumulative position errors occurring per prescribed period of time; the controller comprising a calculating unit for calculating a numeral denoting each instructed incremental moving of the movable machine section per prescribed period of time from a position-controlling instruction; means for accumulatively adding a numeral denoting each instructed incremental moving of the movable machine section for each said prescribed period of time; means for carrying out the accumulative subtraction of each detected actual incremental moving of the movable machine section read out from the buffer register for each said prescribed period of time; and a position error register for generating an output denoting an actual position error per prescribed period of time from a difference between outputs from the addition and subtraction means.

2. A position-controlling system for calculating, upon receipt of a position-controlling instruction changing with time, each instructed position incremental moving value of a movable machine section per prescribed period of time, thereby to control the position of the movable machine section through a servo system, which comprises a reference counter for periodically providing a referential pattern numeral upon receipt of a clock pulse issued from a clock pulse oscillator; a phase type position detector for shaping an exciting waveform from a count made by the reference counter, thereby to detect the momentarily changing position of the movable machine section; means for producing a sampling control signal from an output from the reference counter; a buffer register for storing the content of the reference counter according to a control signal supplied from the control signal-generating means and a phase data read out from the phase type position detector or preferably at a timing immediately preceding the sampling signal; and a controller for calculating each instructed position incremental moving value of the movable machine section per prescribed period of time upon receipt of a data on the detected position of the movable machine section read out from the buffer register, sampling signal and position control signal, thereby giving an accumulative position errors occurring per prescribed period of time; a waveform shaping circuit comprising an amplifier for amplifying an output from the phase detector; flip-flop circuits set or reset upon receipt of a clock pulse according to an output from the amplifier; and an AND gate circuit for generating a logic product of outputs from the flip-flop circuits, wherein, when output voltage from the phase type position detector is changed from positive to negative, the waveform shaping circuit issues one pulse having one clock pulse time width in synchronization with a clock pulse delivered from the clock pulse oscillator; and the buffer register is supplied upon receipt of said one clock pulse, with the content of the reference counter.

3. A position error controlling system according to claim 1, wherein said controller further includes an error-correcting circuit which comprises a calculating unit for carrying out a prescribed form of calculation, a gate circuit formed of a logic circuit for producing the corrected contents of the calculating unit, and means for carrying out subtraction between an output from the gate circuit and a data stored in a register designed to be loaded with an output from the gate circuit, said data being different from the gate circuit output in respect of timing.

4. A position controlling system for controlling the position of a movable machine section, comprising:
 a. a clock pulse oscillator;
 b. a reference counter for generating a periodic reference pattern numeral upon receipt of a clock pulse generated by said clock pulse oscillator;
 c. means for producing a sampling control signal periodically at an interval which is a multiple of the period of said reference counter output;
 d. position detector means coupled to said movable machine section for generating a periodic transition output signal which varies in phase according to the position of said movable machine section and which has the same period as said reference counter;
 e. means for generating a first signal when the periodic transition of said position detector means occurs immediately before the reception of each sampling signal;
 f. a buffer register for storing the contents of said reference counter when said first control signal is generated;
 g. means for generating a second signal having a first state when the timing at which said first signal is generated lies in one cycle period of said reference counter and having a second state when said timing lies outside one cycle period of said reference counter;
 h. a controller means which receives said sampling signal, the data of said buffer register and said second signal, thereby producing a position error signal at its output terminal and which comprises:
  (1) a position error register for storing a position error data between the instructed position and actual position of the movable machine section, the position error data being transferred to said output terminal of the controller in response to each sampling signal;
  (2) first calculating means for calculating a numeral denoting each instructed incremental position of the movable machine section per period of the sampling signal;
  (3) a first position register for storing the output of the first calculating means;
  (4) means for accumulatively adding said numeral denoting each instructed incremental position to the contents of the first position register in response to each sampling signal;
  (5) second calculating means for calculating a numeral denoting each correct actual incremental position of the movable machine section per period of the sampling signal from the data of said buffer register in response to said second signal;
  (6) a second position register for storing the output of said second calculating means; and
  (7) means for accumulatively subtracting the output of the second calculating means from the contents of said second position register in response to each sampling signal; and
 (i) servo driving means for receiving said position error signal from the output terminal of said controller means and for converting the position error digital signal into an analog signal for driving a servo amplifier which drives a servo motor coupled to said movable machine section.

5. The position-controlling system according to claim 1 further comprising means for detecting immediately before the sampling time whether a timing at which the buffer register is stored with the content of the reference counter lies in one cyclic period of the reference counter; and a circuit means for correcting errors detected by the phase type position detector according to an output from the detecting means and the content of the buffer register; the detected error-correcting circuit comprising a calculating unit for carrying out a prescribed form of calculation; a gate circuit formed of a logic circuit for producing the corrected content of the calculating unit; and means for carrying out subtraction between an output from the gate circuit and a data stored in a register designed to be loaded with an output from the gate circuit, said data being different from the gate circuit output in respect of timing.

* * * * *